Patented Nov. 1, 1927.

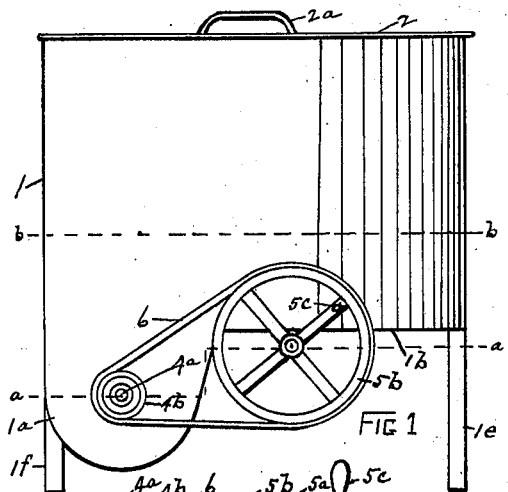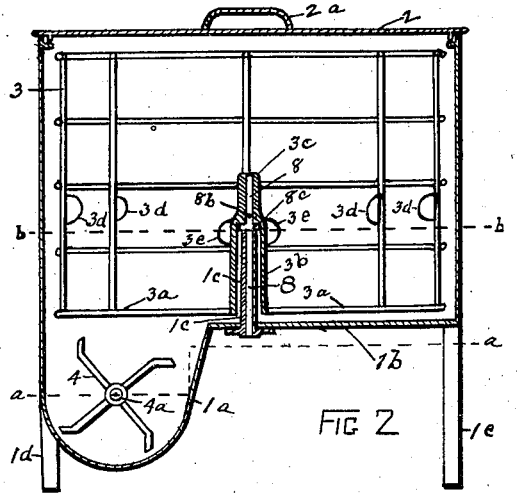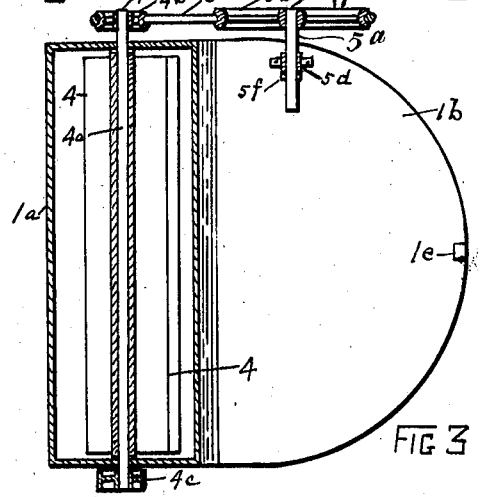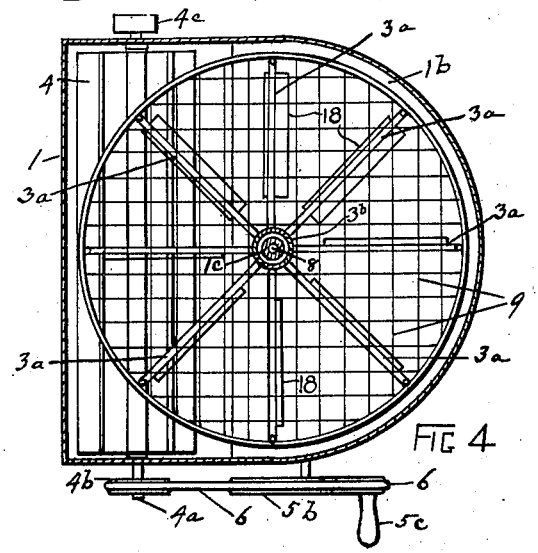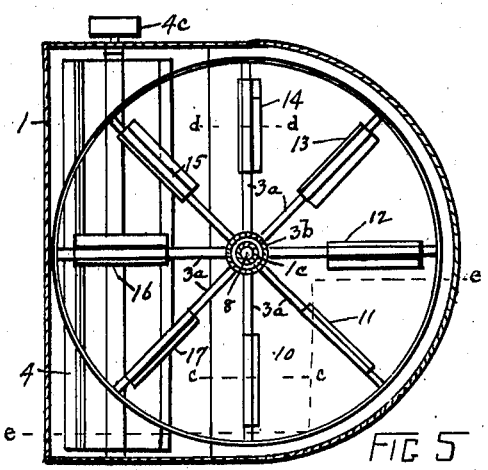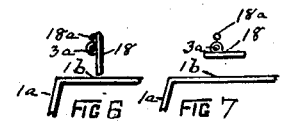

1,647,420

UNITED STATES PATENT OFFICE.

GUSTAVE WENZELMANN AND HALSTEAD GEORGE PATON, OF GALESBURG, ILLINOIS.

DISHWASHING MACHINE.

Application filed April 18, 1921. Serial No. 462,117.

Our invention relates to machines for washing dishes and our object is to provide a device that insures thorough washing, rinsing and, if desired, drying, without the necessity of handling the dishes during these combined operations.

Our device comprises means whereby the dishes are slowly turned while water is being thrown against them, thus exposing all parts of the dishes to the action of the water.

One manner of applying the principle of our invention is shown in the accompanying drawings, in which and in this written specification each reference character used always designates the same part.

Fig. 1 of the drawings is a side elevation of a dish-washing machine, embodying our improvements.

Fig. 2 is a medial, vertical section of same.

Fig. 3 is a horizontal sectional view of same on line $a$—$a$ of Figs. 1 and 2, looking upward.

Fig. 4 is a horizontal sectional view on line $b$—$b$ of Figs. 1 and 2, looking downward.

Fig. 5 shows the same view of an alternative construction.

Figs. 6 and 7 are vertical sections showing the action of the vanes.

Container 1 is provided with a removable cover 2, with handle $2^a$. Within container 1 is revolvably mounted a dishrack or receptacle 3, of open-work construction, cylindrical in form with open top end, the bottom end of same being provided with spokes $3^a$, connecting with hub $3^b$. Said hub is chambered around post $1^c$ of container 1, and extends above said chambered portion to form bearing $3^c$. Receptacle 3 is provided with lugs, $3^d$, projecting inward, and hub $3^b$ has lugs $3^e$ spaced around its exterior. These lugs, or other suitable devices, may be used as supports for the dishes to be placed in receptacle 3.

A centrifugal impeller, 4, having one or more blades, but shown with four blades in the drawings, is mounted on shaft $4^a$, to hang entirely below receptacle 3, preferably under one side thereof, in a depressed portion, $1^a$, of container 1. Shaft $4^a$ extends through the side walls of container 1 and is arranged to revolve in suitable bearings, which are attached to said walls. Pulleys $4^b$ and $4^c$ are firmly mounted on the projecting ends of shaft $4^a$.

A shaft $5^a$ mounted in a bearing $5^d$ extends beyond the edge of bottom $1^b$ and has pulley $5^b$ attached to said extending end and so placed as to cooperate with pulley $4^b$ in carrying connecting drive belt 6. A handle $5^c$ is attached to pulley $5^b$, near its rim, and may be used as a crank for turning said pulley and the parts connected therewith.

A shaft 8 extends upward through a suitable bearing in post $1^c$, being supported on said post $1^c$ by collar $8^c$ and extending above said collar to receive bearing $3^c$ of receptacle 3. Chambered hub $3^b$ loosely surrounds collar $8^c$, together with post $1^c$. The weight of receptacle 3 and its contents rests on the top of collar $8^c$ and is carried with same, when shaft 8 revolves. An open mesh wire bottom, 9, is placed on spokes $3^a$ to prevent dishes from falling through. The sides of receptacle 3 are provided with similar lining when found desirable.

The manner of operation of our device is easily understood from the foregoing description of the parts thereof. The dishes to be washed are placed in receptacle 3, being suitably spaced apart. A moderate quantity of water, hot and soapy if desired, is placed in container 1, running naturally to the bottom of depressed portion $1^a$ and being preferably limited in amount so as to lie below shaft $4^a$ while the parts are at rest. Cover 2 having been put on, the operator turns wheel $5^b$, by means of handle $5^c$, thereby transmitting motion, through belt 6 to pulley $4^b$ and, through shaft $4^a$ to impeller 4, the blade of which, at the upper part of its revolution, moves toward the central portion of container 1. By this motion of the impeller, some of the water in depressed portion $1^a$ is raised and carried upward, being discharged by centrifugal force and thrown through and across receptacle 3, dashing against the dishes contained therein. Some of the water thus thrown by impeller 4 passes above the dishes, falling back over same, nearly all returning to depressed portion $1^a$, for continued action by impeller 4, as long as kept in motion by the operator.

When this process has been completed, the dirty water is drawn off by means of any suitable outlet in the bottom of depressed portion $1^a$. Clear water, hot if desired, is then placed in container 1 and, by a few turns of pulley $5^b$, operating in the same manner as before, the dishes are thoroughly rinsed. The rinsing water is drawn off and cover 2 is removed, the dishes being allowed to remain in receptacle 3 until dry. This results quickly, if the rinsing water is hot when used.

If desired, receptacle 3 may be lifted out of container 1 and it is easily replaced. Such removal is rarely necessary however, as the rinsing process leaves the container and all parts thoroughly cleansed and they dry off naturally in a very short time, after hot water used in rinsing is removed.

By means of pulley 4$^c$ and a suitable belt, the power for operating our device may be supplied from any desired source, such as an electric motor, a gasoline engine, etc.

It will be understood that we do not limit ourselves to the construction and manner of operation already described, the essential principles of our invention being applicable under numerous variations of form and with varied means of producing the results obtained by use of the form and means already set forth herein and at the present time considered preferable.

A means of causing the desired revolution of receptacle 3 is indicated in Figs. 6 and 7. The wings 10 to 17, shown in Fig. 5, show wings of the construction shown at 18, in Figs. 6 and 7, in action as they are attached to spokes 3$^a$ by a hinge connection, the larger part of each wing, 18, hanging, normally, below its spoke 3$^a$, as shown in Fig. 8, and a smaller part extending above said hinge connection far enough to engage a stop, 18$^a$, which prevents the turning of wing 18 in one direction, beyond a practically vertical position, but permits turning of the same in the other direction to a horizontal position. Such wings, 18, being substituted for wings 10 to 17 inclusive, Fig. 5, each wing 18, in passing the point where wing 10 is shown in said Fig. 5, is arranged to hang in its vertical position and to be so held by stop 18$^a$, when it is acted upon by water thrown from impeller 4. This tends to push that part of receptacle 3 away from said impeller. On approaching the point where wing 14 is shown in Fig. 5, each wing 18, when acted upon by water from impeller 4, is thereby caused to assume its horizontal position, offering little resistance to the passage of said water. Revolution of receptacle 3 is thus caused and continues as long as water from impeller 4 is thrown with sufficient force. This turning of receptacle 3 also results in presenting all sides of the dishes contained therein to the action of the water.

We claim as follows, viz—

1. A machine for washing dishes comprising a container, a dish rack rotatable around a vertical axis therein and a centrifugal impeller mounted in said container below the dish rack, at one side of the axis thereof and adapted to throw water through all portions of said revolvable rack simultaneously; and, in combination with said structure, a plurality of blades attached to and projecting from said rotatable rack, in the path of water thrown by said impeller, said blades being hingedly attached to the bottom of the dish rack and radially disposed, each blade being so mounted as to yield to pressure on one flat side thereof and to receive and transmit to the rack the impetus derived from the momentum of impeller driven water when directed against the other flat side.

2. A dish washing machine comprising a casing, a rotatably mounted dish rack therein, means adapted to project water through said dish rack at an angle to the axis of said dish rack, and a plurality of blades hinged to said rack and adapted to utilize the shock of water striking one side thereof to rotate said dish-rack while yieldingly folding under the shock of water striking the other side thereof.

In witness whereof we hereunto subscribe our names this 16 day of Apr., A. D. 1921.

GUSTAVE WENZELMANN.
HALSTEAD GEORGE PATON.